Aug. 5, 1952      G. E. KLETZKE      2,606,056
PIPE HOLDER

Filed Dec. 21, 1949      2 SHEETS—SHEET 1

INVENTOR.
GEORGE E. KLETZKE
BY
Arthur O. Andersen
ATTORNEY

Aug. 5, 1952   G. E. KLETZKE   2,606,056
PIPE HOLDER
Filed Dec. 21, 1949   2 SHEETS—SHEET 2
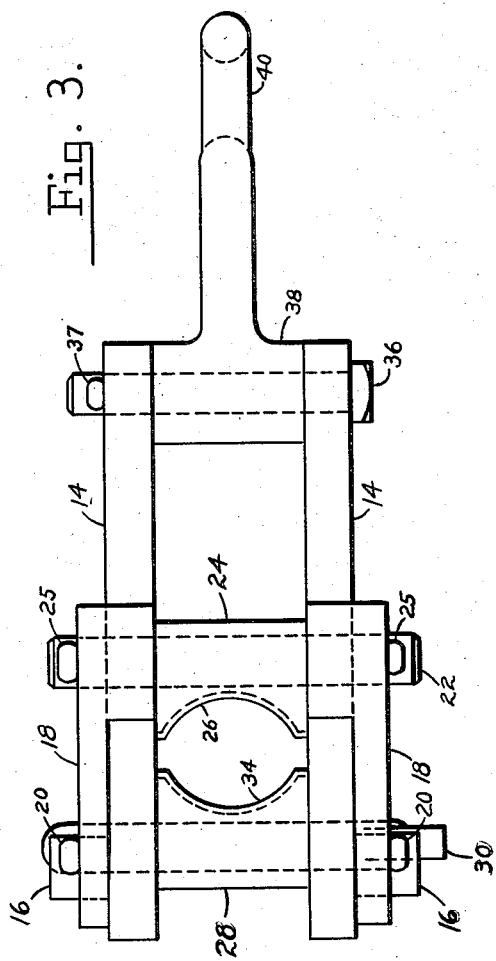
INVENTOR.
GEORGE E. KLETZKE
BY
Arthur O. Andersen
ATTORNEY Patented Aug. 5, 1952

2,606,056

UNITED STATES PATENT OFFICE 2,606,056

PIPE HOLDER

George E. Kletzke, La Crescent, Minn.

Application December 21, 1949, Serial No. 134,310

2 Claims. (Cl. 294—86)

This invention relates to a holder or clamp for elongated cylindrical objects and particularly to holders for holding well pipe when the pipe is raised for any reason. The clamp of this invention may be used to hold the pipe in raised position or it may be mounted on the pipe as a safety measure to keep the pipe from dropping in the event that other holding mechanism fails or is released for movement of the pipe.

It is an object of this invention to provide a holder which can be easily assembled around a pipe.

It is another object of this invention to provide a holder which will allow movement of the pipe in one direction with respect to the clamp, but which will securely clamp and prevent movement of the pipe in another direction.

It is a further object of this invention to provide a holder which can be easily and inexpensively manufactured and which is very effective in use.

Further objects and advantages of the invention will appear in the following description, read in conjunction with the accompanying drawings which form part of this specification.

Fig. 3 is a top view of the holder.

Figure 1:
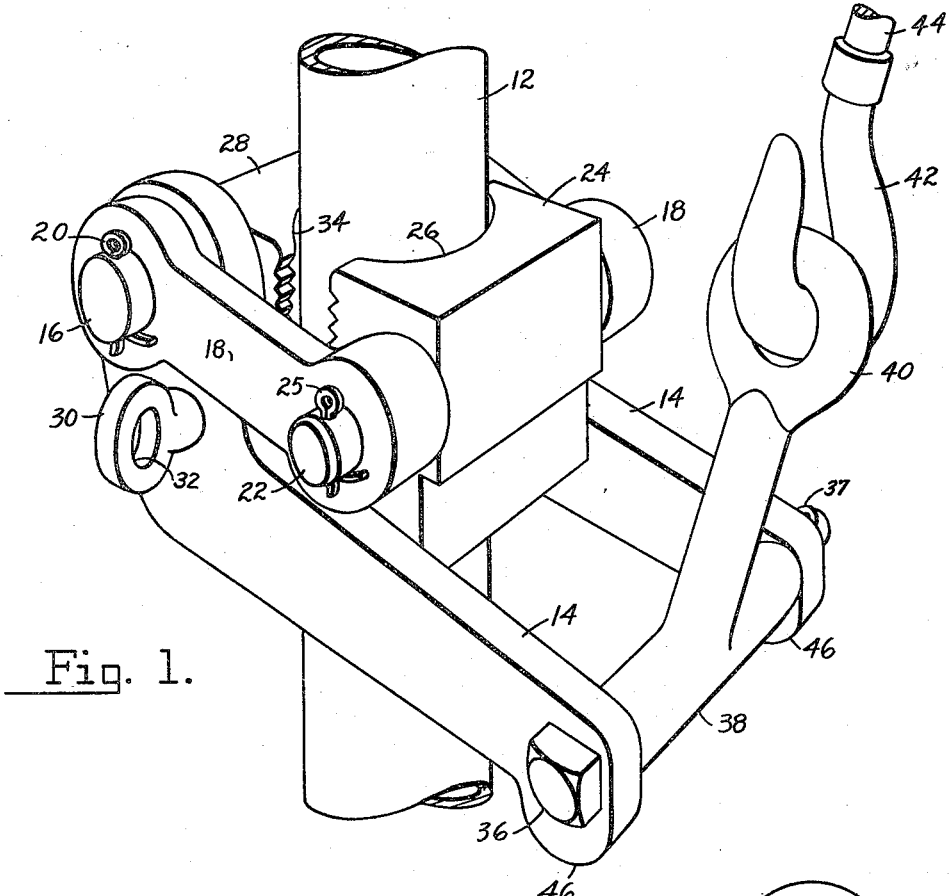
Fig. 1 is a perspective view of the holder of this invention applied to a pipe.
Figure 2:
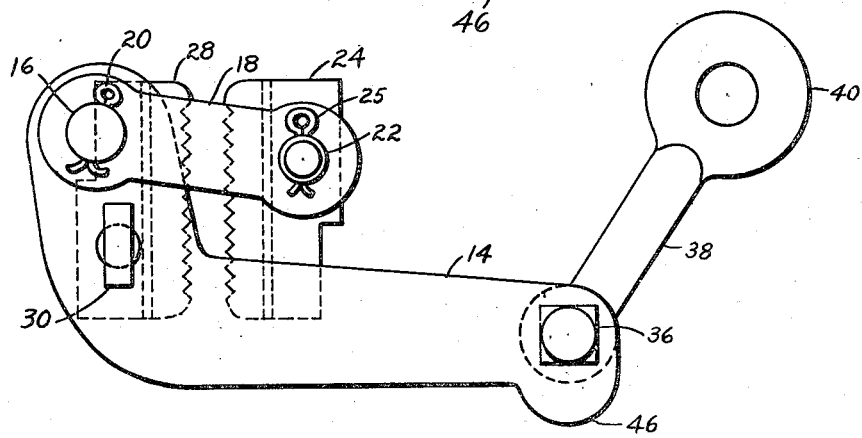
Fig. 2 is a vertical elevation of the holder of the present invention.

Referring to the drawing in detail, numeral 12 designates the pipe which is held by the clamp of this invention. The clamp has two lever members 14 which are spaced to straddle the pipe 12. Each lever 14 has a cylindrical pin 16 extending outwardly therefrom.

Links 18 are pivoted at one end on each of the pins 16 of the levers 14. Cotter pins 20 extend through the outer end of each of the pins 16. A cylindrical pin 22 extends through the other ends of the links 18 and pivotally supports a jaw 24 which is held in place by abutting the links 18. Cotter pins 25 extend through the outer ends of pin 22 to hold the pin 22 in place. The jaw 24 has concave arcuate teeth 26 which engage the pipe 12. Another jaw 28 extends between the levers 14 and is pivoted to said lever 14 by a pin 30 which extends through the levers 14 and the jaw 28. The pin 30 is removable and has an eye 32 at one end so that it may be easily grasped for removal. The jaw 28 has concave arcuate teeth 34 and is identical to the jaw 24, but is inverted with respect to jaw 24. The outer ends of levers 14 are connected by a bolt 36. A cotter pin 37 extends through the end of bolt 36 to hold it in place. Pivotally supported on bolt 35 is a member 38 which has an eye portion 40 which receives a hook 42. Hook 42 is fastened to a cable 44 which is in turn fastened to a support member above the well.

The levers 14 have downwardly extending portions 46 below the bolt 36. If the pipe should start to drop into the well by reason of the cable 44 being unfastened, the portions 46 will strike the floor around the well and clamp the pipe 12 to prevent it from falling into the well.

In assembling the holder on a pipe, the pin 30 is removed permitting removal of the jaw 28. The holder is then placed in position against the pipe 12 and the jaw 28 is held in position while the pin 30 is pushed into place so that it extends through the levers 14 and the jaw 28. When the cable 44 is fastened to support the pipe 12, the levers 14 will tend to move in a counterclockwise direction about the pin 30. Pins 16 will also tend to move in a counterclockwise direction about the pin 30. Pins 16 will also tend to move in a counterclockwise direction and through links 18 will pull the pin 22 toward the pipe 12. Jaw 24 is supported by pin 22 and jaw 24 will also move toward pipe 12 to securely clamp the pipe between the two jaws 24 and 28.

Should the pipe 12 drop for any reason the portions 46 of the levers 14 will strike the floor around the well and cause the levers 14 to move in a counterclockwise direction to clamp the pipe 12 in the manner descrbied.

I claim:

1. A pipe holder comprising a pair of levers spaced to receive a pipe therebetween, each of said levers having a first portion extending generally vertically and a second portion extending generally horizontally from the lower end of said first portion, a pair of links, each of said links being pivoted at one end to one of said levers at the upper end of said first portion and extending from said first portion in a direction substantially parallel to said second portions of said levers, a first pipe engaging jaw pivoted to the other ends of said links, a second pipe engaging jaw pivoted to the lower ends of said first portions of said levers, and means on the ends of said second portions of said levers which are remote from said first portions, said last mentioned means being adapted to engage a support to force said levers and links into a position in which the jaws clamp a pipe.

2. A pipe holder comprising a pair of levers spaced to receive a pipe therebetween, each of said levers having a first portion extending generally vertically and a second portion extending generally horizontally from the lower end of said first portion, a pair of links, each of said levers having one of said links pivoted thereto at the upper end of said first portion, each of said links extending from its pivotal connection with said levers in a direction substantially parallel to said second portions of said levers, a first pipe engaging jaw pivoted to the other ends of said links, a second pipe engaging jaw pivoted to the lower ends of said first portions of said levers and an apertured member pivotally secured to the ends of said second portions of said levers which are remote from said first portions, said apertured member being adapted to engage a fixed object to support said pipe clamp against the force of gravity.

GEORGE E. KLETZKE.

REFERENCES CITED

The following references are of record in the file of this patent:

UNITED STATES PATENTS

| Number | Name | Date |
|---|---|---|
| 338,427 | Mericle | Mar. 23, 1886 |
| 1,642,832 | Traves | Sept. 20, 1927 |
| 1,702,349 | Krell | Feb. 19, 1929 |